UNITED STATES PATENT OFFICE.

WALTER MÜLLER, OF RIXDORF, GERMANY.

PROCESS OF ACIDIFYING MILK FOR MANUFACTURING OLEOMARGARINE.

SPECIFICATION forming part of Letters Patent No. 644,624, dated March 6, 1900.

Application filed January 12, 1899. Serial No. 701,921. (No specimens.)

*To all whom it may concern:*

Be it known that I, WALTER MÜLLER, a subject of the German Emperor, and a resident of Rixdorf, near Berlin, Germany, have invented a certain new and useful Process of Acidifying Milk for the Manufacture of Oleomargarine, of which the following is a full, clear, and exact specification.

In the manufacture of the better kinds of artificial butter only cream and full or unskimmed milk are now employed, the same being subjected to an artificial acidification shortly before the admixture of the raw products by introducing a suitable fermenting material, (anaërobic bacteria,) because it is generally assumed that the aroma developing during the process of acidification is derived from the milk-fat.

In the experiments which have led to the present invention it was shown, though, that acidifying skim-milk is capable of developing at least the same aroma if the following process is applied during the process of acidification, and if applied to unskimmed or full milk it produced a vigorous and fine aroma not hitherto obtained.

The process consists in hermetically sealing the skimmed or unskimmed milk from contact with the atmosphere immediately after the introduction of the fermenting material, which will bring about a hastening of the natural acidification. This is obtained in the simplest manner by pouring over the milk a layer of fat or analogous matter.

The sealing of the milk from contact with the atmosphere will have the following effects: First, the anaërobic bacteria planted into the milk can develop quickly and are not impeded by the oxygen of the air, as is the case otherwise; secondly, the fineness of the developed aroma is preserved completely and is not interfered with, as otherwise, by the oxidizing action of the oxygen of the air, and, thirdly, the generated aroma is concentrated, because it cannot escape.

The sealing from contact with the atmosphere is maintained until a sufficient acidification of the milk is obtained according to experience. When acidification is reached, the medium employed for the hermetical sealing is removed and the acidified milk, which excels now by a vigorous and fine aroma, is worked immediately with the raw material used in margarine making in the usual manner.

I claim as my invention—

The herein-described process for generating aroma or enhancing the same in acidifying milk, consisting in introducing into the milk a suitable fermenting medium and then immediately hermetically sealing the same from contact with the atmosphere, until it has reached the intended degree of acidification.

In witness whereof I have hereunto set my hand in presence of two witnesses.

WALTER MÜLLER.

Witnesses:
OTTO MUNK,
HUGO LOUIS BEIL.